Figure 1:
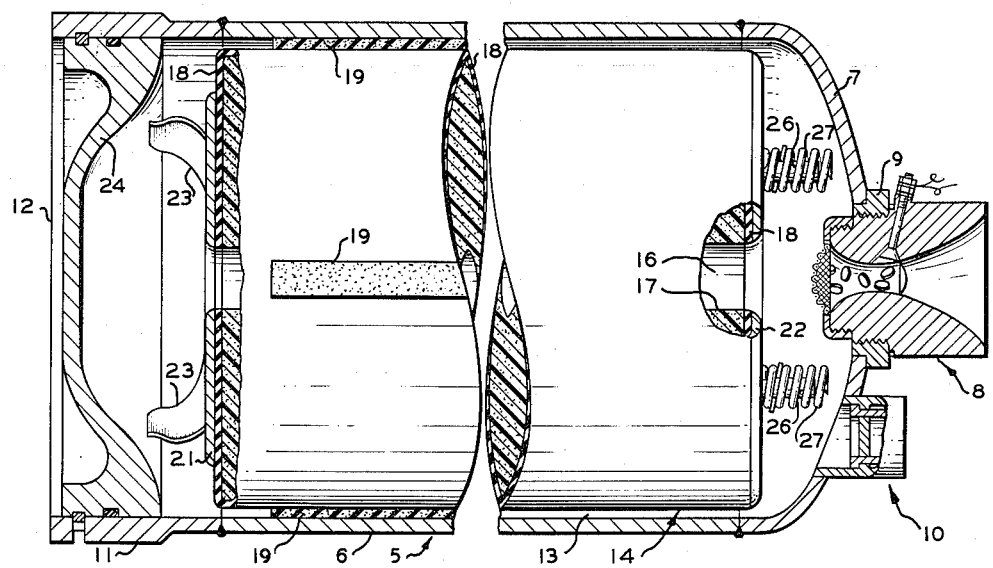

March 28, 1961   D. D. KOBBEMAN   2,976,680
COMBINATION IGNITER AND NOZZLE
Filed Dec. 21, 1956

INVENTOR.
D. D. KOBBEMAN
BY Hudson & Young
ATTORNEYS

United States Patent Office 2,976,680
Patented Mar. 28, 1961

2,976,680

COMBINATION IGNITER AND NOZZLE

Donald D. Kobbeman, McGregor, Tex., assignor, by mesne assignments, to the United States of America as represented by the Secretary of the Air Force Filed Dec. 21, 1956, Ser. No. 629,998

6 Claims. (Cl. 60—35.6)

This invention relates to the ignition of solid rocket propellants. In one aspect it relates to a reaction propulsion device having a novel combination of nozzle, igniter and starter disc elements. In a further aspect it relates to an improved rocket motor charged with solid propellant and especially adapted for assisting the take-off of aircraft.

Rocket motors, such as the type with which this invention is concerned, generally comprise a cylindrical casing defining a combustion chamber loaded or charged with a solid rocket propellant which, upon ignition and burning, generates large volumes of gases at high pressures and temperatures. These gaseous products are discharged from the combustion chamber at high velocity through a nozzle located at the rear or aft end of the chamber, thus developing propulsive thrust which propels the rocket motor forward.

An important design criterion for rocket motors is the weight of the rocket chamber and other metal parts. Emphasis is put on minimum weight, since each pound which can be decreased from the rocket chamber and other metal parts (hereinafter referred to as inert rocket components) may be replaced by a pound of useful pay load or propellant charge. This is especially true in the case of high performance rocket motors where the reduced weight of inert rocket components can make the difference between success and failure. In many rocket motors used heretofore, such as those employed in assisting the take-off of aircraft, e.g., JATO units, one factor which contributed to the weight of the inert rocket components was the positioning of a separate igniter assembly in the head end or casing of the rocket motor. The use of a separate igniter assembly entailed the provision of another opening in the casing in addition to that opening necessary for the discharge of gaseous products. This additional opening also entailed the use of a metal boss or other supporting means for the igniter assembly with consequent increase in the weight of inert rocket components. In addition, this opening for the igniter assembly reduced the strength of the casing and meant that sealing means such as a ring seal had to be employed to keep pressure stresses away from critical points and prevent leakage of gases. The possibility also arose of moisture, dust, or other contaminating material entering the combustion chamber through this additional opening. Then, too, the handling and assembling of such rocket motors was involved and sometimes costly.

One of the factors affecting the predetermined designed mass burning rate (lbs./per second) of a solid propellant is the linear burning rate (inches per second) of the propellant. The linear burning rate is pressure-sensitive so that the greater the combustion chamber pressure the greater the burning rate, and vice-versa. The combustion chamber pressure initially developed by combustion of the propellant is often insufficient to maintain a great enough linear burning rate so as to obtain the desired, designed mass burning rate. As a result, fluctuating combustion chamber pressures are obtained, thereby causing development of a non-uniform thrust and, in some cases, the chamber pressure developed may drop low enough, e.g., below 200 p.s.i.a., to cause a misfire. In order to initially obtain a linear burning rate such that the propellant will burn at its predetermined mass burning rate, it has been found to be necessary to provide means for maintaining a hot zone adjacent and immediately below the propellant burning surfaces.

Figure 2:
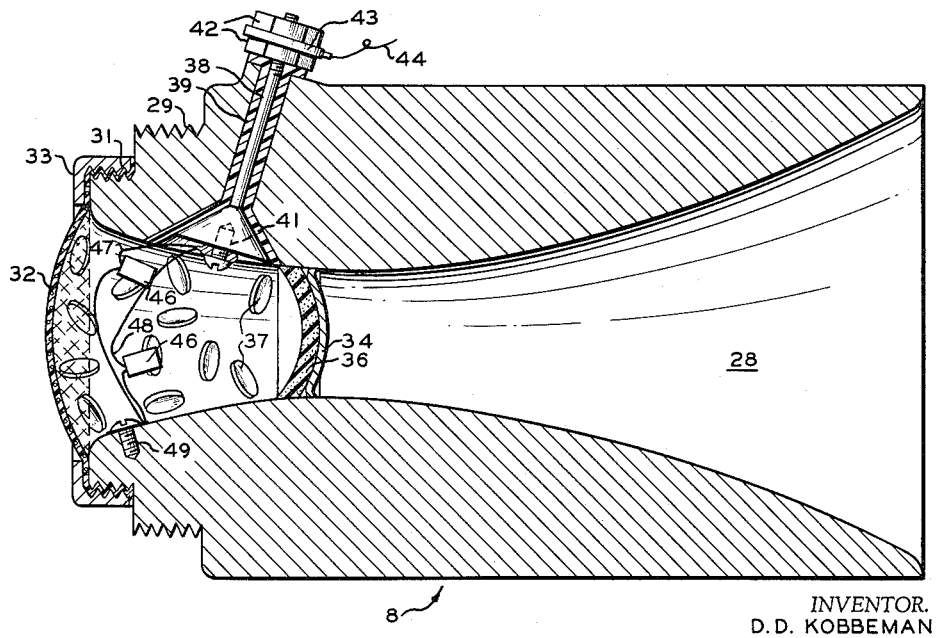

Accordingly, an object of this invention is to provide an improved rocket motor. Another object is to provide a rocket motor having a novel combination of nozzle, igniter and starter disc elements. Another object is to provide a rocket motor having a separate nozzle with improved igniter means so disposed therein as to increase the ratio of pay load to rocket motor weight. A further object is to provide a rocket motor with novel ignition means so designed that the propellant will burn at its desired mass burning rate with no severe ignition delays or undesirable pressures. A further object is to provide a rocket motor with novel ignition means so disposed as to increase the strength of the rocket motor casing. A still further object is to provide a rocket motor characterized by ease of handling and assembling and improved operational features such as low igniter shock. Further objects and advantages of our invention will become apparent, to those skilled in the art, from the following discussion, appended claims and accompanying drawings in which:

Figure 1 is a side elevational view in partial longitudinal section of one type of charged rocket motor illustrating the preferred embodiment of our invention; and Figure 2 is an enlarged side elevational view of the nozzle section illustrated in Figure 1.

Broadly contemplated, the rocket motor of my invention comprises a tubular casing defining a combustion chamber with a separate nozzle secured to the aft end of the casing and defining a Venturi type passage. The inlet of the passage is in communication with the aft end of the combustion chamber, across which inlet end is positioned a perforate member such as a wire mesh. Across the converging section of the Venturi type passage is positioned a starter disc. Adjacent the inner face of the starter disc is a sustainer member made of a propellant composition. The cavity or space defined by the inner faces of the perforate member and the sustainer member, and the nozzle walls therebetween, is filled with readily ignitable, particulate material which is adapted to be ignited by electro-responsive means.

Referring now to the drawing, in which like parts have been designated with like reference characters, and to Figure 1 in particular, a rocket motor generally designated 5 is illustrated and represents one form of a jet propulsion motor which may be employed, for example, to assist the take-off of aircraft. Rocket motor 5 has a cylindrical casing 6 having a reduced aft portion 7 which defines an axial opening which is in communication with a separate nozzle generally designated 8 which is secured to the casing portion 7 by an annular lock member 9. The reduced casing portion 7 has a safety plug attachment generally designated 10 therein capable of releasing excessive pressure from the combustion chamber, in a manner well known to those skilled in the art. The other or head end of the casing 6 is in the form of an enlarged portion 11 and this end of the casing is closed by means of a closure or cap member 12.

The casing 6 defines a combustion chamber 13 in which is loaded a solid rocket propellant grain generally designated 14. This particular grain 14 is cylindrical in shape and has an outer diameter smaller than the inner diameter of the casing 6. The grain 14 is of the internal-burning type by reason of an axial perforation 16 which defines an internal burning surface 17. The outer cylindrical surface and the two ends of the grain 14 are covered with burning restricting material 18. A plurality of resilient retaining pads or strips 19 made of sponge rubber, for example, are placed between the head portion of the grain 14 and the adjacent head portion of casing 6. Retaining end plates 21 and 22 are attached to the ends of the grain 14 adjacent the outer faces of the restricting material attached to these ends. The plates 21 and 22 as well as the restricting material adjacent thereto have axial openings therein which are in alignment with the perforation 16. Secured to the head retaining plate 21 are outer-extending prongs or legs 23 which are adapted to register with the grain retaining assembly 24 which is secured to the inside of the head end of the casing 6. The aft retaining plate 22 has secured to its outer surface a plurality of prongs 26 surrounded by compression springs 27 which are adapted to come into contact with the inside of the reduced portion 7.

Although the rocket motor illustrated in Figure 1 illustrates a preferred embodiment of our invention, it is to be understood that our invention is not to be unduly limited thereto. The rocket motor can be charged with other solid propellant grains having different configurations and burning surfaces. For example, the rocket motor can be charged with propellant grains of the external-burning, end-burning, or internal-external-burning types. These grains can be supported by suitable means other than that shown in Figure 1. End-burning and internal-burning grains can be bonded to the motor casing. In place of the grain retaining assembly 24, the head retaining plate 21 can be provided with suitable retaining means such as prongs and springs similar to that of the aft retaining plate.

Referring now to Figure 2, a description of my novel combination of nozzle, igniter, and starter disc elements will now be set forth. The nozzle 8 has a Venturi type passage 28 defined by the inner walls of the nozzle 8. As employed herein and in the appended claims, the term "throat" designates that portion of the nozzle passage 28 having the smallest cross-sectional area. The outer head end of the nozzle 8 is provided with a threaded shoulder 29 which is adapted for attachment by lock member 9 to the aft end of the casing of the rocket motor 5 of Figure 1. This end of the nozzle 8 is also provided with an additional threaded shoulder 31. Across the inlet opening of the nozzle is a perforate member 32, held to the head end of the nozzle by an annular cap 33 having a flange which is threaded onto shoulder 31, securing the perforate member 32 therebetween.

In the converging portion of the nozzle passage 28 is a starter disc 34 which is crimped or otherwise secured therein. Adjacent the inner face of the starter disc 34 is a sustainer disc 36 (diverging concavo-convex in shape) made of propellant material, which can be cemented to the starter disc and/or walls of the passage 28. The cavity or space defined by the inner face of the perforate member 32 and sustainer disc 36, and the inner walls of the nozzle passage therebetween, is filled with ignition material 37, preferably in the form of discrete particles or pellets. The nozzle 8 is provided with a substantially lateral bore 38 in which is positioned an insulated bolt 39 having a flared inner end in which is threaded a screw 41. The other end of the bolt 38 extends outwardly from the nozzle 8 and suitable nuts 42 threadably hold a conducting washer 43 thereon. An electrical lead wire 44 is connected at one end to washer 43 to supply current thereto from a suitable power source, such as a battery. Suitable fuses, matches, or squibbs 46 are embedded in the ignition material 37. Electrical lead wires 47 and 48 connect these fuses in parallel between the screw 41 and a suitable ground screw 49.

In the operation of the rocket motor shown in the drawing, upon closing a suitable switch, electric current flows to the fuses 46 which, consequently, function in a well-known manner in igniting the igniter material 37.

The igniter material 37 in burning forms hot combustion gases which, after being momentarily held back, rupture the rubbery or plastic material covering the perforations, which material can be subsequently softened and melted upon being contacted with the hot gases rushing through the perforations. The gases resulting from the burning of the igniter material 37 enter the combustion chamber 13 of the rocket motor 5, initially establishing a working pressure and temperature therein and thereby igniting the propellant 14 on the burning surface 17.

As stated hereinbefore, the initially developed working pressure is often insufficient to maintain a great enough linear burning rate of the propellant. To prevent the development of a fluctuating combination chamber pressure, the sustainer disc 36 is provided. Since the igniter material 37 is in contact with the sustainer disc 36, ignition of the former results in ignition of the latter. The burning of the sustainer disc 36 also produces hot gases which are directed over the propellant burning surface 17 during a period of time in excess of that required for burning of the igniter material 37. For example, while the igniter material 37 may burn for about 150 milliseconds, the sustainer disc 36 burns for a period of about 500 milliseconds. The hot combustion gases furnished by the sustainer disc 36 provide sufficient heat to maintain the required hot zone below the burning surface 17. The burning of the sustainer disc 36 also provides additional combustion gases which make up for the deficiency in chamber pressure until stable burning surfaces have been established and equalized. The sustainer disc 36 also functions in some degree to initially absorb any igniter shock which may develop due to the ignition of the igniter material 37.

Depending upon the size and configuration of the grain 14 and its burning characteristics, the amount of igniter material 37 and the amount and size of the sustainer disc 36 can be varied. Sufficient igniter and sustainer materials are utilized so as to provide a desirable constant working pressure in the combustion chamber 13. In the case of JATO units, the combustion pressure may be in the range of 200 to 1500 p.s.i., preferably between 600 and 1000 p.s.i. Should this working pressure be exceeded the safety plug 10 is adapted to rupture and release excessive pressure. The starter disc 34 is adapted to be ejected from the outlet opening of the nozzle 8 when the desired working pressure is established in the combustion chamber. Thereafter, the combustion gases formed by burning the grain 14 flow from the combustion chamber through the outlet opening in the nozzle 8, thereby imparting thrust to the rocket motor.

Combining the nozzle, igniter, and starter disc elements into a separate, integral structure, as disclosed herein, aids in the handling and assembling of the rocket motor in that this structure may be separately stored and shipped in moisture proof containers and readily attached to the rocket motor when the latter is ready for service.

The solid propellants for which the rocket motor of our invention is particularly adapted comprise a fuel and an oxidant for oxidizing the fuel. Ammonium nitrate and ammonium perchlorate are preferably employed as the oxidant whereas the fuel component is generally a hydrocarbon material which serves as a binder for bonding the solid oxidant particles into a solid grain, as well as acting as a fuel. Material suitable for use as the binder include asphalt, rubber, and other tacky hydrocarbon-containing materials. Recently, superior solid propellant materials have been discovered which comprise a major proportion of a solid oxidant, such as ammonium nitrate or ammonium perchlorate, and a minor amount of a rubber binder material, such as a copolymer of a conjugated diene and a vinylpyridine or other substituted heterocyclic nitrogen base compound, which after incorporation is cured by a vulcanization or quaternization reaction. Solid propellant mixtures of this type and a process for their production are disclosed and claimed in copending U.S. application, Serial No. 284,447, filed April 25, 1952, by W. B. Reynolds and J. E. Pritchard.

The perforate member 33 can be made of a plastic or rubber-coated wire mesh. The wire mesh (metal or plastic filaments) may be made by dipping uncoated mesh into a container of rubber solution or plastic material such as cellulose acetate plastic molding compound, or other suitable covering material which will soften or rupture upon being subjected to heat and pressure. Suitable wire mesh can be fabricated from a carbon steel wire, 6 mesh, 0.035 inch diameter, SAE 1010.

The igniter material 37 is preferably in granular or pelleted form and can be made of any suitable material generally employed in the rocket art for ignition purposes, e.g., black powder, and preferably an especially useful igniter material disclosed and claimed in copending U.S. application, Serial No. 592,995 filed June 21, 1956, by L. G. Herring. As disclosed in the latter mentioned application, the igniter composition is formed of a plurality of discrete particles or pellets comprising powdered metal, powdered inorganic oxidizing material, and ethyl cellulose as a binding agent.

The ignition sustaining material is in general a propellant composition which is relatively easy to ignite and capable of furnishing hot combustion gases during the initial part of the firing period. Preferably, the material is capable of delivering combustion gases during at least the initial 500 milliseconds of the firing period. The composition generally comprises a mixture of (1) an oxidant such as ammonium chlorate or potassium chlorate, (2) a polysulfide polymer binder, and (3) a finely divided material such as aluminum, magnesium or titanium. A preferred sustainer formulation comprises between 60 and 75 weight percent of an oxidizer, such as potassium perchlorate, between 5 and 25 weight percent of finely divided metal, such as aluminum, and between 10 and 40 weight percent of polysulfide polymer binder. The oxidizer is utilized in finely divided form, e.g., 100 to 250 mesh, while the elemental metal is in the form of a powder preferably having a mesh size between 250 and 325. It is preferred to use potassium perchlorate as the oxidizer because of the very hot combustion gases produced when this material is included in the sustainer formulation. It is also within the purview of the invention to employ other inorganic oxidizing materials such as barium nitrate, potassium nitrate, sodium nitrate, sodium perchlorate and other alkali metal perchlorates. The polysulfide polymer serves as the fuel as well as the binder for the propellant composition. It is also within the scope of the invention to use other rubbery polymers as the binder material, such as neoprene, GR–S rubber, and copolymers of a conjugated diene and a vinylpyridine, such as disclosed in the above cited Reynolds and Pritchard application. However, it is preferred to use a polysulfide polymer because it can be readily molded and cured at low temperatures, e.g., room temperature.

Various modifications and alternations of our invention will become apparent, to those skilled in the art, without departing from the scope and spirit of our invention, and it is to be understood that the foregoing description and drawings merely represent a preferred embodiment thereof.

I claim:

1. A reaction propulsion device comprising a tubular casing defining a combustion chamber, said combustion chamber being loaded with a solid propellant charge, said propellant charge having a longitudinally axial perforation extending substantially through the center thereof, nozzle means secured to said casing and having a Venturi type passage, said passage having an inlet opening communicating with said chamber and an outlet opening for the discharge of gaseous products, a perforate member positioned across said inlet opening and sealing the same, said perforate member being in substantial axial alignment with said axial preforation in the said propellant, said axial perforate member having a plurality of small openings normally closed with a coating material adapted to fail when subjected to heat, an imperforate ejectable disc-like obturating member positioned solely across the converging section of said passage and removably secured at its periphery to the walls of said nozzle means defining said passage, said obturating member completely sealing said passage and adapted to be displaced and open said passage to said chamber when a predetermined pressure is attained within said chamber, a disc-like ignition sustainer member positioned across said passage adjacent the inner face of said obturating member, ignition material completely filling that portion of said passage between said perforate member and said sustainer member, and electro-responsive means to provide ignition of said ignition material.

2. A rocket motor comprising a tubular casing defining a cylindrical combustion chamber, said combustion chamber being loaded with a solid propellant charge, said propellant charge having a longitudinally axial perforation extending substantially through the center thereof, separate nozzle means secured to said casing, said nozzle means having a Venturi type passage in axial alignment with said chamber, said passage having an inlet opening communicating with said chamber and an outlet opening for discharge of gaseous products, a perforate member secured to said nozzle across said inlet opening and sealing the same, said perforate member being in substantial axial alignment with said axial perforation in the said propellant, said axial perforate member having a plurality of small openings normally closed with a coating material adapted to fail when subjected to heat, an imperforate ejectable disc-like obturating member secured to said nozzle solely across the converging section of said passage and removably secured at its periphery to the walls of said nozzle means defining said passage, said obturating member completely sealing said passage and adapted to be displaced and open said passage to said chamber when a predetermined pressure is attained within said chamber, a disc-like ignition sustainer member positioned across said passage adjacent the inner face of said obturating member, particulate ignition material completely filling that portion of said passage between said perforate and sustainer members, said particulate ignition material comprising a mixture of (1) solid inorganic oxidizing material, (2) finely divided metal, and (3) ethyl cellulose, and electro-responsive means to provide ignition of said ignition material.

3. A rocket motor comprising a tubular casing defining a cylindrical combustion chamber, said combustion chamber being loaded with a solid propellant charge, said propellant charge having a longitudinally axial perforation extending substantially through the center thereof, separate nozzle means axially secured to the aft end of said casing, said nozzle means having a Venturi type passage in axial alignment with said chamber, the inlet end of said passage communicating with said chamber and the outlet end of said passage adapted for discharge of gaseous products from said chamber, a wire mesh member secured to said head nozzle member across said inlet opening and sealing the same, said mesh member being in substantial axial alignment with said axial perforation in said propellant, said mesh member being coated with material which will fail under subjection to heat, an imperforate starter disc solely across the converging section of said passage and removably secured to the walls of said nozzle means defining said passage, said starter disc completely sealing said passage and adapted to be displaced and ejected through the outlet of said passage so as to open the same to said chamber when a predetermined pressure is attained within said chamber, an ignition sustainer disc positioned across said passage and bonded to the inner face of said starter disc, the composition of said sustainer disc comprising (1) an inorganic oxidizing material, (2) a polysulfide polymer, and (3) a finely divided metal, pelleted ignition material completely filling that portion of said passage between said wire mesh and sustainer disc, the composition of said pelleted ignition material comprising a mixture of (4) inorganic oxidizing material, (5) finely divided metal selected from the group consisting of aluminum, magnesium, and titanium, and (6) ethyl cellulose, at least one electro-responsive fuse member embedded in said ignition material, and means to fire said fuse member so as to ignite said ignition material.

4. A reaction propulsion device comprising a tubular casing defining a combustion chamber, said combustion chamber being loaded with a solid propellant charge, said propellant charge having a longitudinally axial perforation extending substantially through the center thereof, nozzle means secured to said casing and having a Venturi type passage, said passage having an inlet opening communicating with said chamber and an outlet opening for the discharge of gaseous products, a perforate member positioned across said inlet opening and sealing the same, said perforate member being in substantial axial alignment with said axial perforation in the said propellant, said axial perforate member having a plurality of small openings normally closed with a coating material adapted to fail when subjected to heat, an imperforate ejectable disc-like obturating member positioned solely across the converging section of said passage and removably secured at its periphery to the walls of said nozzle means defining said passage, said obturating member completely sealing said passage and adapted to be displaced and open said passage to said chamber when a predetermined pressure is attained within said chamber, ignition material completely filling that portion of said passage between said perforate member and said obturating member, and electro-responsive means to provide ignition of said ignition material.

5. A rocket motor comprising a tubular casing defining a cylindrical combustion chamber, said combustion chamber being loaded with a solid propellant charge, said propellant charge having a longitudinally axial perforation extending substantially through the center thereof, separate nozzle means axially secured to the aft end of said casing, said nozzle means having a Venturi type passage in axial alignment with said chamber, the inlet end of said passage communicating with said chamber and the outlet end of said passage adapted for discharge of gaseous products from said chamber, a wire mesh member secured to said head nozzle member across said inlet opening and sealing the same, said mesh member being in substantial axial alignment with said axial perforation in said propellant, said mesh member being coated with material which will fail under subjection to heat, an imperforate starter disc solely across the converging section of said passage and removably secured at its periphery to the walls of said nozzle means defining said passage, said starter disc completely sealing said passage and adapted to be displaced and ejected through the outlet of said passage so as to open the same to said chamber when a predetermined pressure is attained within said chamber, an ignition sustainer disc positioned across said passage and bonded to the inner face of said starter disc, pelleted ignition material completely filling that portion of said passage between said wire mesh member and starter disc, at least one electro-responsive fuse member embedded in said ignition material, and means to fire said fuse member so as to ignite said ignition material, the composition of said sustainer disc comprising (1) potassium perchlorate, (2) a polysulfide polymer binder, and (3) finely divided aluminum, the composition of said ignition material comprising (4) potassium perchlorate, (5) powdered aluminum, and (6) ethyl cellulose.

6. The rocket motor according to claim 5 wherein said last-mentioned means comprises an insulated electrical conducting bolt passing through the walls of said nozzle means, the inner end of said bolt being connected by electrical resistance wires to said fuse member, and the outer end of said bolt adapted to be secured to an electrical power source.

References Cited in the file of this patent

UNITED STATES PATENTS

| | | |
|---|---|---|
| 2,502,458 | Hickman | Apr. 4, 1950 |
| 2,561,670 | Miller | July 24, 1951 |
| 2,627,810 | Catlin | Feb. 10, 1953 |
| 2,696,429 | Hart | Dec. 7, 1954 |
| 2,720,749 | Beebe | Oct. 18, 1955 |
| 2,791,962 | Terce | May 14, 1957 |